E. M. McKENZIE.
TRACTOR.
APPLICATION FILED APR. 22, 1918.
1,316,627.
Patented Sept. 23, 1919.
4 SHEETS—SHEET 1.
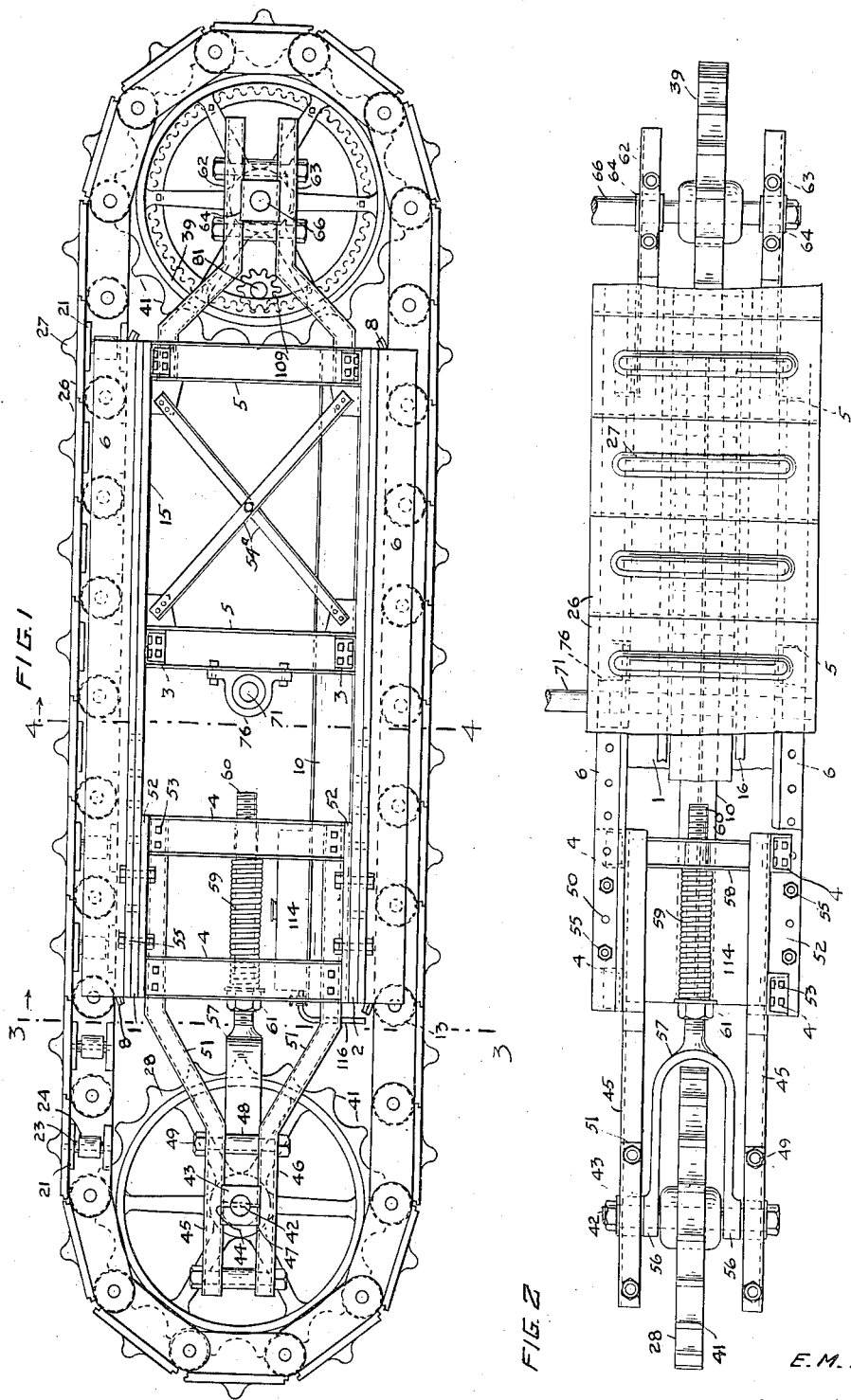
INVENTOR
E. M. McKENZIE
BY F. M. Wright
ATT'Y.

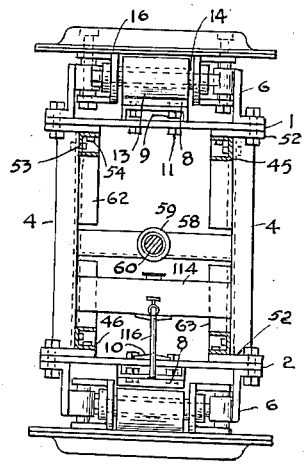

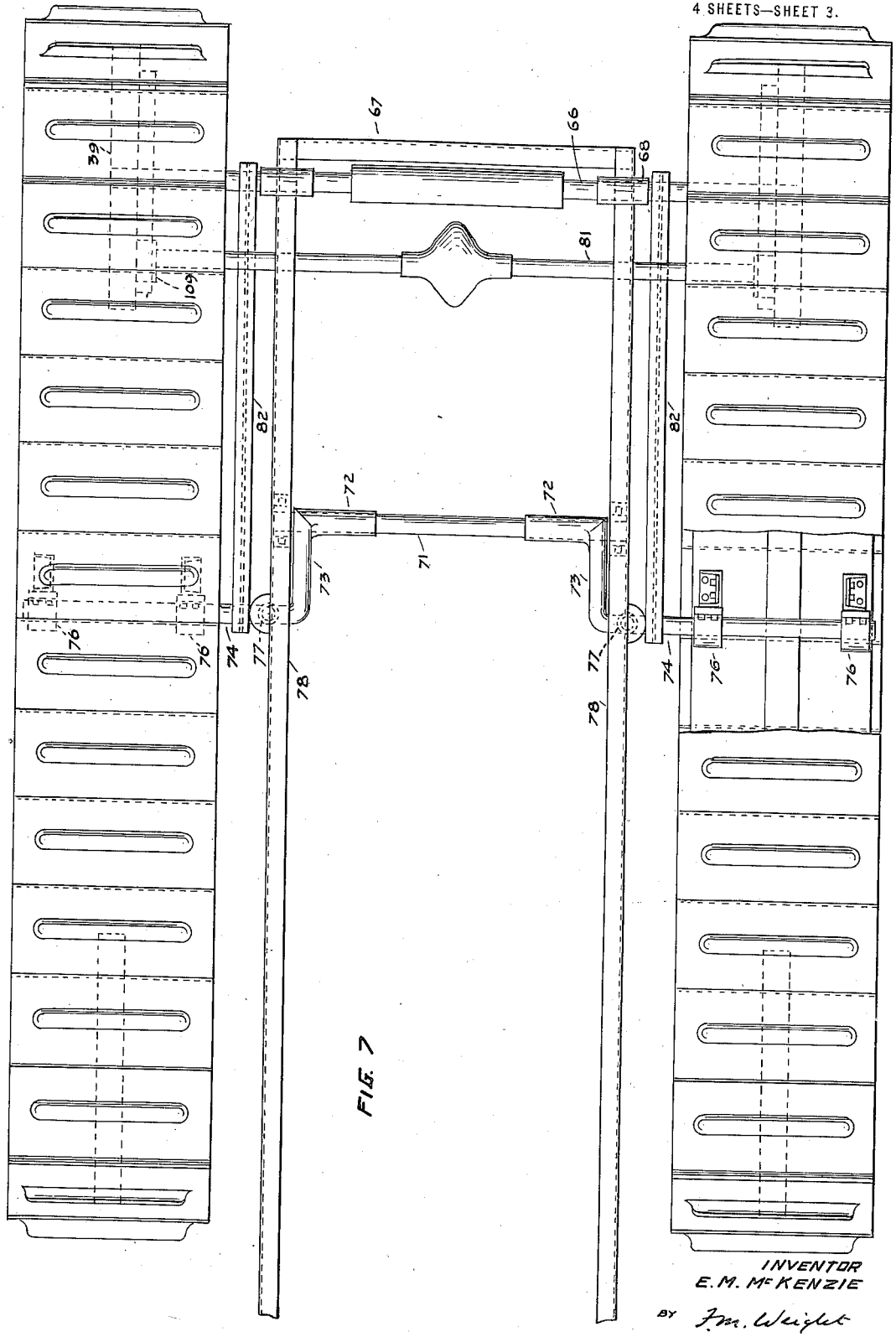

E. M. McKENZIE.
TRACTOR.
APPLICATION FILED APR. 22, 1918.

1,316,627.

Patented Sept. 23, 1919.
4 SHEETS—SHEET 4.

INVENTOR
E. M. McKENZIE by J. M. Wright,
ATTY.

UNITED STATES PATENT OFFICE.

ERNEST M. McKENZIE, OF NAPA, CALIFORNIA.

TRACTOR.

1,316,627.     Specification of Letters Patent.   Patented Sept. 23, 1919.

Application filed April 22, 1918. Serial No. 230,102.

*To all whom it may concern:*

Be it known that I, ERNEST M. MCKENZIE, a citizen of the United States, residing at Napa, in the county of Napa and State of California, have invented new and useful Improvements in Tractors, of which the following is a specification.

The present invention relates to improvements in tractors of the caterpillar type.

One object is to provide a caterpillar traction attachment for ordinary trucks whereby any truck can be converted into a caterpillar traction engine.

A further object is to provide, in such an attachment, either for trucks or tractors, means for holding the front portion of the tractor down to the ground and for preventing it from moving laterally.

A further object is to provide a frame for supporting the bearings of the traction wheels and around which the chain travels, so constructed that said bearings may be drawn near each other to permit the chain to be slackened and one or more links removed therefrom.

A further object is to provide means for resisting side thrust upon the tread without unduly increasing the friction from said thrust.
A further object is to reduce the friction on the connections between the ends of the links resulting from the pressure thereon.

A further object is to provide a tread having links which can be formed very cheaply and having sides which can be interchanged, thereby reducing the cost of making the links by enabling both sides to be made from one pattern.

A further object is to provide in a tread shoes of very simple and economical construction and provided with removable traction grips which can be interchanged for those of different sizes and shapes and so constructed as to reduce the number of parts for securing in place said grips, and also the anti-friction means above referred to.

A further object is to provide means whereby the bearings for the wheels of the traction device will be automatically maintained as far apart as possible, thus insuring that there is no lost motion in the chain.

Other objects and advantages of the invention will appear in the description thereof and particularly pointed out in the claims.

Figure 8:
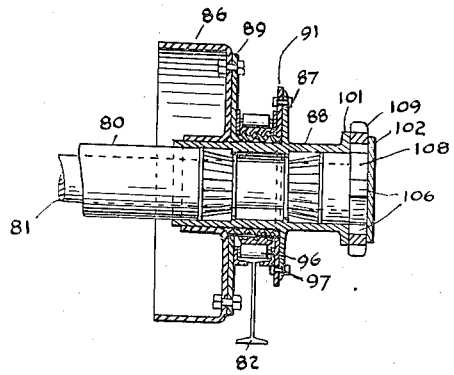
Figure 9:
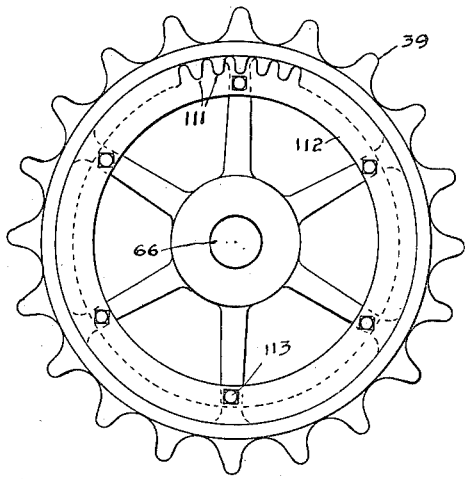
Figure 10:
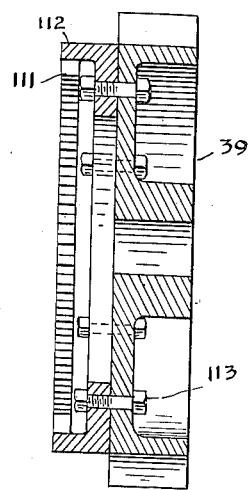
Figure 11:
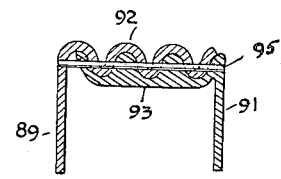
Figure 12:
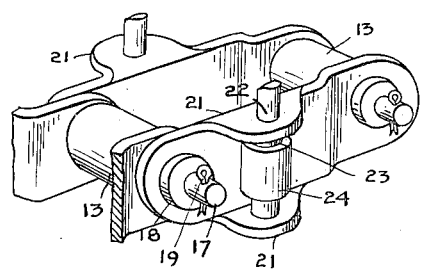

In the accompanying drawings, Figure 1 is a side view of a tread attachment to a caterpillar tractor; Fig. 2 is a broken plan view of the same; Fig. 3 is a cross-section on the line 3—3 of Fig. 1; Fig. 4 is a cross-section on the line 4—4 of Fig. 1; Fig. 5 is an enlarged cross-sectional view showing the upper part of the mechanism shown in Fig. 3; Fig. 6 is a similar view showing the upper part of that shown in Fig. 4; Fig. 7 is a broken plan view of the caterpillar tractor, various parts not pertinent to my invention being omitted; Fig. 8 is a longitudinal sectional view of a shaft and a pinion thereon; Fig. 9 is a detail side view of a sprocket wheel; Fig. 10 is a sectional view of the same through the axis; Fig. 11 is a detail sectional view of a housing; Fig. 12 is a perspective view of a tread chain link.

My improved attachment includes an extensible frame, for the purposes of insuring the absence of lost motion in the tread chain, and so that said chain can readily be slackened to any extent desired and one or more links can be removed therefrom.

Referring to the drawing, 1, 2, indicate upper and lower plates, which are respectively secured at their edges by sheet metal brackets 3 to the tops and bottoms of standards 4, 5, preferably channel irons, of which the rear standards 5 are fixedly secured, thus constituting a stationary frame 15, and the front standards 4 are movably secured to the plates 1, 2, constituting a movable frame. On the center of the upper side of the lower plate is a longitudinally extending I-beam 10, serving to strengthen the frame formed by said plates and standards. On the outer sides of said plates 1, 2, are secured, near their margins, longitudinally extending angle irons 6, and near their centers channel irons 7, on the outside of which channel irons are secured wear plates 8 of chilled steel. Said wear plates are secured to the middle members of the channel irons by means of short counter-sunk bolts 9, (Fig. 6) and the latter are secured to the plates 3, 4, by means of bolts 11 (Fig. 5), the wear plates being provided with square holes 12 to receive with a close fit the heads of the bolts. On said wear plates can roll rollers 13, which rotate around spacing tubes 14, (Fig. 5), which space from each other the ends of opposite sheet metal link members 16 of links (Fig. 12), of the tread chain, said ends being connected to each other by bolts 17 through said spacing tubes, washers 18 around said bolts, and cotter pins 19 through said bolts outside said washers. It will be observed that both members of the link are precisely alike in form, so that any link member can be used on either side of the link. Said link members 16 are of sheet metal and are formed with ears or plates 21 extending outward from the main portions of the link members, and through each pair of ears extends a bolt 22, around which is a spacing tube 23, (Fig. 6), around which in turn is a roller 24. The rollers 24 roll against the inner surfaces of the vertically extending members of said angle plates 6, which thereby, without undue friction, take up the side thrust imparted to the tread by the movement of the machine over the ground.

To those ears 21 which extend from the outer edges of the companion link members of opposite links is secured a shoe 26, also of sheet metal, and to the outer side of the central portion of the shoe is secured a traction grip 27. Each grip 27 is secured to a shoe 26, and the shoe 26 is secured to the ears 16 by the same bolts 22, which serve as shafts for the rollers 24. Said traction grips may be of any desired form, and it will be observed that, by the above construction, said grips can be readily removed and others substituted therefor.

Said links travel around a front sprocket wheel 28 and a rear driving sprocket wheel 39, said wheels being formed with teeth 41 to engage the rollers 13. The front wheel turns around a shaft 42, the ends of which are fixed in blocks 43, the ends of said shaft being secured to said blocks by means of taper pins 44 driven therethrough. Said blocks are slidably supported between upper and lower longitudinally extending channel irons 45, 46. The central portions of the upper and lower edges of the blocks are grooved, as shown at 47, to receive the horizontal members of the channel irons and retain the blocks thereon. The front ends of each pair of channel irons, and also portions thereof to the rear of the blocks, are spaced from each other by spacing tubes 48 and are connected together by bolts 49. Behind the rear bolts 49 the channel irons diverge, as shown at 51, extending respectively upwardly and downwardly, and form the front portion of a movable frame. They are connected at their rear ends with longitudinally extending flat plates or bars 52, which are connected to the tops and bottoms of the front standards 4. The channel irons 45, 46, are connected not only by bolts 53 to the two front standards 4 on each side, but also by bolts 54 to the plates 52. The plates 52 are connected to the upper and lower plates 1, 2, and the angle irons 6 by the bolts 55. When it is desired to move the front sprocket wheel 28 rearwardly, toward the main frame of the attachment, the bolts 55 are withdrawn, and then the channel irons 45, 46, the first two standards 4, and the plates 52, are moved rearwardly. The bolts 55 are then replaced through the same holes in the plates 52, but through different holes 50 in the plates 1, 2, and angle irons 6. In this position the chain is very much slackened, so that one or more links can be removed therefrom according to the new position of the front wheel 28. The rear standards 5 are connected to one another by oblique ties 54$^a$.

Extending around the shaft 42 are the front ends of members 56 of a yoke-shaped piece 57, of which the rear end is threaded, as shown at 60, and extends centrally of the machine and is guided through a longitudinally extending hole in a cross-member 58 extending between the second pair of standards 4. Around said rod is a coiled spring 59 which is compressed between said cross-member and a nut 61 screwed upon the rod, so that said spring always forces the shaft 42, and the wheel 28 rotating thereon, forwardly and thus takes up any slack in the chain.

To the rear ends of the top and bottom of the stationary frame 15 are secured pairs of channel irons 62, 63, similar in general arrangement to the channel irons 45, 46, and converging rearwardly, and which are attached to blocks 64, in which are contained the ends of a shaft 66 upon which can turn the rear driving sprocket wheel 39, the sprocket teeth of which engage the rollers of the chain.

It is to be understood that one of said tread frames or attachments, carrying the tread and the chain thereon, is located on each side of a tractor frame 67, which is of a common construction, and which rests partly upon bearings 68 for the shaft 66.

If the weight of the tractor is transmitted to the tread attachments solely through said rear shaft 66, and none of said weight is borne by the front portion of said attachments, any obstructions or unevenness in the ground would tend to raise the front ends of said attachments, and in doing so to reduce the tractive power of the chain. Moreover, any obstruction encountered by the forward part of the tread, and which does not meet said forward parts squarely, tends to force it to one side or the other, and, if the tread frame is connected to the tractor frame only by the rear axle, its laterally acting force would act upon the tread frame at the end of a very long arm, namely, the whole length of the tread frame, and would place a severe strain upon the rear axle and the bearings therefor. To avoid these results I secure to the tractor frame a fixed transverse shaft 71 (Fig. 7) on which, at each side of the tractor frame, are loose sleeves 72, from which sleeves extend forwardly and downwardly arms 73, which arms at their outer ends are extended outwardly, as shown at 74, in directions transverse to the tractor and tread frame, and through bearings 76 on the tread frames. Said shaft 71, after passing through the sleeves 72, is supported at its ends on the frame 78. Coiled springs 77 are compressed between the longitudinal members 78 of the tractor frame and said extensions 75 of the arms and resiliently force the tread frames downwardly, so that a considerable portion of the weight of the tractor frame is resiliently supported upon portions of the tread frame considerably more advanced than the rear axle, thereby holding the treads of said tread frames down to the ground and furnishing sufficient traction in all cases. The arrangement of the sleeves 72 and arms 74 out of alinement with each other and of the sleeves 72 loose on the shaft 71, permits the vertical movement of either arm 74 independently of the other relatively to the sleeves. Moreover, the above arrangement resists to a considerable degree any tendency of the tread frame to move laterally due to obstructions which may be met.

An important feature of my invention relates to the means whereby these tread attachments can be attached to an ordinary self-propelled truck to convert it into a tractor. First, to the truck, like the tractor, are attached the fixed transverse shaft 71, having the sleeves 72 and arms 73, and also the bearings 68 for the shaft 66. Then the rear wheels of the truck are removed from its driving axle 81 and the said rear axle is caused to rest at its ends upon I-beams 82 of which the front ends rest upon the transversely extending portions 74 of the arms, and the rear ends rest upon the shaft 66 carrying the rear sprocket wheels 39.

A common construction of the truck wheels comprises wooden spokes retained by bolts between a brake drum 86, (Fig. 8) and a flange 87 on a tubular hub 88 surrounding a tube 80 carrying the weight and through which passes the driving axle 81. These bolts and the spokes are removed, and in place of the spokes there are interposed between the brake drum and the flange a housing consisting of inner and outer annular disks 89, 91, (Fig. 11) having at their inner edges tubular threaded extensions 92, 93, screwed into one another, and secured by screws or studs 95 through the engaging portions of the threads. The outer tubular extension furnishes a support for a roller bearing 96 which rolls in a casing 97 secured to the I-beam 82, its rollers rolling in said casing upon said I-beam.

Said tubular hub 88 is rotated in the same manner as when it formed part of the rear wheel of the truck. For this purpose there is secured between a flange 101, extending outwardly from the outer end of the hub, and a cover plate 102, a ring, having at its inner edge a number, as four, of recesses, which are engaged by dogs or teeth 106 extending radially outward from a disk 107 formed on the corresponding end of the driving axle 81. In the present case, this ring is removed and in place thereof there is substituted a ring 108, having on its outer periphery a pinion 109, so that said pinion is rotated in the same way as the rear wheel was rotated by the power which drives the rear axle. Said pinion is so arranged that it engages internal gear teeth 111 formed upon a ring 112 removably secured by bolts 113 to a rear sprocket wheel 39 of the corresponding tread attachment. 114 indicates an oil receptacle from which oil drips by a pipe 116 upon the rollers of the tread.

What is claimed is:

1. In a tractor, a tread frame, bearings secured to the ends of said tread frame, sprocket wheels, shafts therefor mounted in said bearings, a chain engaging said sprocket wheels, rollers carried by said chain, and upper and lower flat wear plates removably secured to said frame between the sprocket wheels and engaged by said rollers.

2. A chain for track laying tractors, comprising links each formed of sheet metal link members and bolts connecting said members, each link member having a main portion and apertured ears bent at right angles thereto, a shaft passing through said apertures, and a roller on said shaft.

3. A chain for track laying tractors, comprising links each formed of sheet metal link members and bolts connecting said members, each link member having a main portion and apertured ears bent at right angles thereto, shafts passing through said apertures, spacing tubes on said shafts between said ears, and rollers on said spacing tube.

4. A track laying tractor chain, comprising links, each formed with side members, each side member having on opposite sides ears bent at right angles to its main portion, a shoe, opposite edges of which lie adjacent to the outer ears of two side members of each link, a bolt extending through the ears on each side member and also through the portion of the shoe adjacent thereto, and a roller around each bolt.

5. A track laying tractor chain, comprising links, each formed with side members, each side member having on opposite sides ears bent at right angles to its main portion, a shoe, the opposite edges of which lie adjacent to the outer ears of two side members of each link, a transversely extending traction grip on each shoe, a bolt extending through the ears on each side member and also through the portion of the shoe and traction grip adjacent thereto, and a roller around each bolt.

6. A track laying tractor tread frame, converging upper and lower bars extending from the front and rear ends of said tread frame, means for spacing apart the outer ends of said bars, bearings secured between said outer ends, shafts in said bearings, sprocket wheels on said shafts, and a tread chain around said sprocket wheels.

7. A track laying traction tread frame, converging upper and lower bars extending from the front and rear ends of said tread frame, means for spacing apart the outer ends of said bars, bearings secured between the said outer ends, the bearings between the front outer ends being slidable, shafts in said bearings, sprocket wheels in said shafts, and a tread chain around said sprocket wheels.

8. A track laying tractor frame, a sprocket wheel rotatably mounted in the rear end of said frame, a frame adjustably secured in the front end of the tread frame and comprising longitudinally extending upper and lower plates, and standards secured to said plates, a sprocket wheel rotatably mounted in the front end of said adjustable frame, and a chain around said sprocket wheels.

9. A track laying tractor tread frame, a sprocket wheel rotatably mounted in the rear end of said frame, a frame adjustably secured in the front end of the tread frame, and comprising longitudinally extending upper and lower plates, and standards secured to said plates, a sprocket wheel rotatably mounted in the front end of said adjustable frame, a chain around said sprocket wheels, a cross member carried by said adjustable frame, a longitudinally extending rod guided in said cross member, means extending around the shaft of the front sprocket wheel and operatively connected to the front end of said rod, and a spring for pressing said shaft forwardly.

10. In combination with a tractor body having a main tractor or frame and tread frames movable vertically independently of the tractor frame and having a transverse driving axle, a tube around said driving axle, a tubular hub around said tube and having a flange, a brake drum around said tubular hub, inner and outer annular disks between the brake drum and the flange, having at their inner edges tubular threaded extensions screwed into one another, means for securing together said extension, a roller bearing supported by the outer extension, a casing for said roller bearing, and beams secured to said casings, of which the rear portions move with the main tractor frame and the front portions move with the tread frames.

11. In combination with a tractor body having a transverse driving shaft, pinions secured on the ends of said shaft, track laying tread frames one on each side of the body, a sprocket wheel supported in the rear end of each tread frame, a shaft therefor, a gear wheel coaxially secured to each sprocket wheel and meshing with the pinion on the same side of the body, an idler sprocket wheel at the front end of each tread frame, arms pivotally attached to said body and extending first forwardly from their pivots and then outwardly, their outer ends being movably attached to the tread frames, bars at the sides of the body and upon mediate portions of which said body is supported, the terminal portions of the bars being supported respectively by the rear sprocket wheels and said arms, and a tread chain around the sprocket wheels of each tread frame.

12. In combination with a tractor body, track laying tread frames one on each side of the body, a sprocket wheel supported in the rear end of each tread frame, a shaft therefor, an idler sprocket wheel at the front end of each tread frame, arms pivotally attached to said body, their outer ends being movably attached to the tread frames, bars at the sides of the body and upon mediate portions of which said body is supported, the terminal portions of the bars being supported respectively by the rear sprocket wheels and said arms, and a tread chain around the sprocket wheels of each tread frame.

13. In combination with a tractor body, tread frames, one on each side of said body, a shaft supporting an end of said tractor body, sprocket wheels on the ends of said shaft, endless chains around said sprocket wheels, a transverse shaft secured to the tractor frame, a vibrating arm supported by each end of the shaft comprising a longitudinally extending member, a sleeve around the shaft at one end of said member and a transversely and outwardly extending member at its other end, and a spring resting on each of the latter members and supporting the adjacent tread frame.

14. In combination with a tractor body, tread frames, one on each side of said body, a shaft supporting an end of said tractor body, sprocket wheels on the ends of said shaft, endless chains around said sprocket wheels, a transverse shaft secured to the tractor frame, a vibrating arm supported by each end of the shaft comprising a longitudinally extending member, a sleeve around the shaft at one end of said member and a transversely and outwardly extending member at its other end, and a spring resting on each of the latter members and supporting the adjacent tread frame, the portion of said tread frame on the other side of spring from said shaft being wholly free to move relatively to the tractor body.

15. In combination with a tractor body, tread frames, one on each side of said tractor body, a rear sprocket wheel in each tread frame, arms pivotally connected to the tractor body and extending forwardly therefrom and resting at their forward ends upon the respective tread frames, a driving shaft, bars on opposite sides of the tractor body supporting said driving shaft, the rear ends of said bars being supported on the rear sprocket wheel shafts and the front ends upon the front portions of said arms.

16. In combination with a truck frame having a driving shaft, pinions secured on the end of said driving shaft, a shaft supported by said truck frame behind the driving shaft, sprocket wheels on said latter shaft, bearings for the ends of said latter shaft, tread frames supporting said bearings and extending forwardly thereof, idler sprocket wheels rotatably supporting the front ends of said tread frames, longitudinally extending sprocket chains around said sprocket wheels, bars on each side of the truck frame, mediate portions of which support the driving shaft, rear ends of said bars resting on the rear sprocket wheel shaft, and front ends being supported by portions of the tread frame in advance of said rear sprocket wheels.

17. In combination with a truck frame having a driving shaft, pinions secured on the end of said driving shaft, a shaft supported by said truck frame behind the driving shaft, sprocket wheels on said latter shaft having internal gear wheels meshing with said pinions, bearings for the ends of said latter shaft, tread frames supporting said bearings and extending forwardly thereof, idler sprocket wheels rotatably supporting the front ends of said tread frames, longitudinally extending sprocket chains around said sprocket wheels, springs compressed between the tread frames and the truck body, bars on each side of the truck frame, mediate portions of which support the driving shaft, rear ends of said bars resting on the rear sprocket wheel shaft, and front ends being supported by portions of the tread frame in advance of said rear sprocket wheels.

ERNEST M. McKENZIE.